Feb. 16, 1926.

F. S. CONNER 1,573,480

OIL BURNER FOR BROODER STOVES

Filed July 6, 1925

INVENTOR.
FRANK S. CONNER.
BY
ATTORNEYS.

Patented Feb. 16, 1926.

1,573,480

UNITED STATES PATENT OFFICE.

FRANK S. CONNER, OF PETALUMA, CALIFORNIA.

OIL BURNER FOR BROODER STOVES.

Application filed July 6, 1925. Serial No. 41,686.

*To all whom it may concern:*

Be it known that I, FRANK S. CONNER, a citizen of the United States, residing at Petaluma, in the county of Sonoma and State of California, have invented certain new and useful Improvements in Oil Burners for Brooder Stoves, of which the following is a specification.

The present invention relates to improvements in direct oil burners such as are being used in brooder stoves to maintain a proper degree of heat for growing chicks. In an oil burner of this character it is of particular importance that the various parts of the burner be arranged to best advantage so that air is admitted at the proper plate to form a proper mixture with vapor rising from the oil contained in an open vessel for producing a smokeless flame. It is further of extreme importance that the various parts constituting the stove and the burner be arranged in such a manner as to keep the place around the burner as well as the oil confined in the vessel up to a certain temperature even when a very low flame is used so as to prevent the rapid cooling off of oil and air which would extinguish the flame. It is proposed in the present invention to arrange the burner in such a manner that the oil contained in the vessel is heated continually even though a small flame be used and that the air used as a supporter of combustion is preheated before reaching the point of mixture with vapor rising from the oil.

It is further proposed to mount the vessel containing the oil in a saucer-shaped pan which allows of overflow of the oil into the pan but which is provided with an outlet at a certain distance from the vessel so as to prevent the overflow oil from rising beyond a certain elevation.

Further objects and advantages of my device will appear as the specification proceeds.

Figure 1:
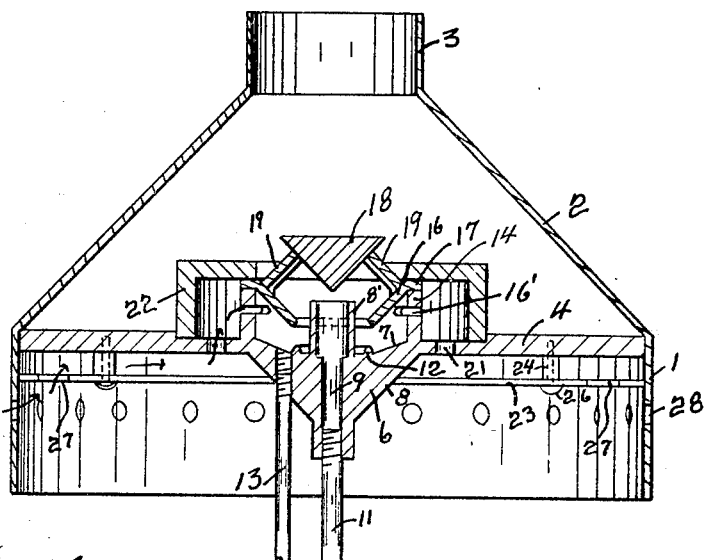
Figure 2:
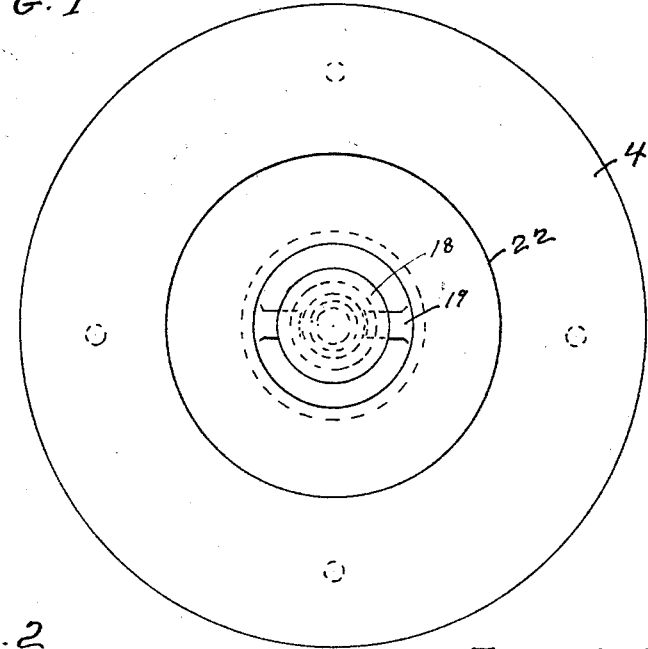

The preferred form of my invention is illustrated in the accompanying drawing in which Figure 1 shows a vertical section through my device and Figure 2 a top plan view of the same.

While I have shown only the preferred form of the invention, I wish to have it understood that various changes or modifications may be made within the scope of the claims hereto attached without departing from the spirit of the invention.

The device as shown in the drawing consists of a housing 1, being cylindrical at the bottom and having a funnel shaped portion 2 rising from the cylindrical portion to terminate in a stack 3. Within the housing, preferably near the joint between the cylindrical portion and the funnel-shaped portion, is provided a plate 4 secured to the cylindrical wall in any suitable manner and forming in its central portion a pan 6 the top 7 of which is shaped like a saucer while the bottom surface 8 of the same is conical. As shown in the drawing the pan is made of considerable thickness so as to retain the heat and to transmit heat to the oil which may be contained in the vessel 8' rising from the center of the pan and communicating through the bore 9 within the pan with the pipe 11 leading to any suitable supply of fuel, such as coal-oil or kerosene. The vessel 8' is preferably cylindrical in form and an annular rib 12 rises from the pan to surround the vessel 8' and to leave a small groove around the vessel into which oil may overflow. Outside of the annular rib 12 there is provided an outlet 13 from the pan which causes oil overflowing over the rib to be discharged therethrough so that the remainder of the pan always remains clean of oil.

From the marginal portion of the pan rises a flange 14, which is perforated as shown at 16 either by a plurality of round holes or by a plurality of long slots. A conical ring 16 is provided with a flat flange 17 adapted to lie on the flange 14 and to support the ring in such a manner that the latter descends towards the vessel 8' but leaves an annular space around the same.

A conical spreader 18 has a plurality of legs 19 associated therewith which rest on the ring 16 and support the conical spreader centrally over the vessel 8' in such a manner that the point of the cone is comparatively close to the oil contained in the vessel and tends to heat the same.

The rim of the pan 6 is surrounded by a series peripherally arranged perforations 21 and a cover 22 confines an annular space around the flange 14 and causes air drawn into the chamber surrounding the vessel 8' to pass through the perforations 21, from there to the perforations 16' in the flange 14, then around the lower edge of the ring 16 so as to rise on the outside of the vessel 8' for producing a charge adapted to burn without forming soot or smoke.

Below the plate 4 there is supported a second plate 23 held in spaced relation by means of spacing elements 24 and screws 26 and provided near the periphery with a series of perforations 27. The cylindrical portion of the housing 1 is also provided with a series of perforations 28 through which air may enter the housing to pass through perforations 27 in the false-bottom 23 into the space between the latter and the plate 4 to finally pass through perforations 21 and 16' into the combustion chamber in the manner previously described.

The advantages of my construction will be readily understood from the foregoing description.

While the oil is burning the spreader 18 is heated and communicates heat to the oil itself by the very proximity of the point of the spreader to the surface of the oil and furthermore transmits heat through the legs 19 which are in the path of the flame or products of combustion to the conical ring 16 which latter by deflecting the air entering from the outside transmits heat units to the latter and also guides the same to accompany the outside of the vessel and to rise along the outside to the most favorable point for mixing with vapor rising from the oil. The comparative thickness of the pan 6 through which the oil has to pass before reaching the vessel and into which a part of the vessel is imbedded tends to retain heat units and to maintain the oil at a certain desired temperature even though a very small flame be used so that a complete cooling off of the oil as well as of the air serving as a supporter of combustion is effectively prevented.

When oil is fed into the vessel 8' so that a part of the same overflows it will be temporarily stopped in the groove between the vessel and the peripheral rib 12 and being subject to the air entering through the perforations 16 may burn therein. Any surplus amount of overflow will run over the rib 12 and will be accommodated in the pipe 13 so that undue spreading of the flame is prevented. The air being guided to the combustion chamber first through the perforations 28, then through the perforations 27 and between the false-bottom 23 and the plate 4, then through the perforations 21 and 16', next under the ring 16 is gradually preheated so as to reach the combustion zone at a temperature where the same may be utilized to best advantage.

Having described my invention, I claim:—

1. In a direct oil burner of the character described, a pan, an open-top vessel rising centrally therefrom, means for admitting oil into the vessel through the pan, a marginal flange rising from the pan, a conical ring resting on the flange and descending toward an intermediate portion of the vessel so as to leave an annular space around the same, the flange being perforated to allow air to be drawn therethrough and through the annular space toward the top of the vessel.

2. In a direct oil burner of the character described, a pan, an open-top vessel rising centrally therefrom, means for admitting oil into the vessel through the pan, a marginal flange rising from the pan, a conical ring resting on the flange and descending toward an intermediate portion of the vessel so as to leave an annular space around the same, the flange being perforated to allow air to be drawn therethrough and through the annular space toward the top of the vessel the pan being made of considerable thickness and of heat conducting and retaining material so as to remain warm although a very low flame is used.

3. In a direct oil burner of the character described, a pan, an open-top vessel rising centrally therefrom, means for admitting oil into the vessel through the pan, a marginal perforated flange rising from the pan, a conical ring resting on the flange and descending toward an intermediate portion of the vessel so as to leave an annular space around the same and a flame spreader having supporting elements thereon resting on the ring for holding the spreader centrally above vessel.

4. In a direct oil burner of the character described, a pan, an open-top vessel rising centrally therefrom, means for admitting oil into the vessel through the pan, a marginal perforated flange rising from the pan, a conical ring resting on the flange and descending toward an intermediate portion of the vessel so as to leave an annular space around the same and a flame spreader having supporting element thereon resting on the ring for holding the spreader centrally above the vessel the spreader being conical in form and allowing its point to come comparatively near the top of the vessel for maintaining the oil in a heated condition.

5. In a direct oil burner of the character described, a saucer-shaped pan, an open-top vessel rising centrally therefrom, means for admitting oil into the vesesl and means for guiding air to rise along the outside of the vessel to support combustion, the saucer-shaped pan having an outlet spaced from the vessel and a small ridge interposed between the outlet and the vessel so as to allow a slight overflow of oil to be burnt around the vessel while preventing spreading of the oil beyond the outlet.

6. In a direct oil burner of the character described, a pan, an open-top vessel rising centrally therefrom, means for admitting oil into the vessel, a perforated flange rising from the rim of the pan, a supporting plate extending horizontally from the rim of the pan formed with perforations around the rim of the pan and a cover element for the flange and a portion of the supporting plate causing air rising through the perforations in the latter to be guided through the flange toward the vessel.

7. In a direct oil burner of the character described, a pan, an open-top vessel rising centrally therefrom, means for admitting oil into the vessel, a perforated flange rising from the rim of the pan formed with perforations around the rim of the pan and a cover element for the flange and a portion of the supporting plate causing air rising through the perforations in the latter to be guided through the flange toward the vessel with a conical ring extending inwardly from the top of the flange guiding the air downwardly and leaving an annular space around the vessel to allow the air to rise therethrough.

8. In a burner of the character described, an oil container, a funnel descending toward the container so as to encircle an intermediate portion of the latter at the throat of the funnel and to deflect a radial draft toward the lower end of the container to rise along the container wall, a spreader over the container to spread the flames rising therefrom and a metallic connection between spreader and funnel causing the latter to heat the former whereby air diverted by the funnel is preheated.

9. In a burner of the character described, an oil container, a funnel descending toward the container so as to encircle an intermediate portion of the latter at the throat of the funnel and to deflect a radial draft toward the lower end of the container to rise along the container wall, a spreader over the container to spread the flames rising therefrom and a metallic connection between spreader and funnel causing the latter to heat the former whereby air diverted by the funnel is preheated, the connection comprising legs resting on the funnel and supporting the spreader.

In testimony whereof I affix my signature.

FRANK S. CONNER.